(12) United States Patent
Kees et al.

(10) Patent No.: US 10,703,210 B2
(45) Date of Patent: Jul. 7, 2020

(54) METHOD OF CONTROLLING A MILD HYBRID ELECTRIC VEHICLE

(71) Applicant: FORD GLOBAL TECHNOLOGIES, LLC, Dearborn, MI (US)

(72) Inventors: Donatus Andreas Josephine Kees, Billericay (GB); Cayetano David Fuente San Juan, London (GB)

(73) Assignee: Ford Global Technologies, LLC, Dearborn, MI (US)

( * ) Notice: Subject to any disclaimer, the term of this patent is extended or adjusted under 35 U.S.C. 154(b) by 941 days.

(21) Appl. No.: 14/542,044

(22) Filed: Nov. 14, 2014

(65) Prior Publication Data

US 2015/0149014 A1 May 28, 2015

(30) Foreign Application Priority Data

Nov. 26, 2013 (GB) .................................. 1320807.9

(51) Int. Cl.
*B60L 50/16* (2019.01)
*B60L 58/12* (2019.01)
(Continued)

(52) U.S. Cl.
CPC ............. *B60L 11/1851* (2013.01); *B60L 1/00* (2013.01); *B60L 1/12* (2013.01); *B60L 15/2045* (2013.01); *B60L 50/16* (2019.02); *B60L 58/10* (2019.02); *B60L 58/12* (2019.02); *B60L 58/20* (2019.02); *H02J 7/1423* (2013.01);
(Continued)

(58) Field of Classification Search
CPC ........... B60W 2710/244; B60W 10/26; B60W 20/106; B60W 10/11; B60W 20/40; B60W 20/50; B60W 10/24; B60L 2240/549; B60L 11/14; B60L 40/13; B60L 11/18; B60L 1/02; B60L 3/04; B60L 7/14; B60L 11/1851; B60L 50/16; B60L 58/12; B60L 58/11; B60L 58/10; B60L 58/20; Y10S 903/903; Y10S 903/93; Y10S 903/902; Y10S 903/905; Y10S 903/907
USPC ....................... 701/22, 112, 123, 36, 54, 93; 180/65.265, 65.29, 65.245, 6.28
See application file for complete search history.

(56) References Cited

U.S. PATENT DOCUMENTS 6,578,649 B1 * 6/2003 Shimasaki ............... B60K 6/44
180/65.225
6,630,810 B2 * 10/2003 Takemasa ............... B60L 58/10
320/104

(Continued)

FOREIGN PATENT DOCUMENTS

WO 2013067292 A2 5/2013

*Primary Examiner* — Hunter B. Lonsberry
*Assistant Examiner* — Luis A Martinez Borrero
(74) *Attorney, Agent, or Firm* — David B. Kelley; Brooks Kushman P.C.

(57) ABSTRACT

A method is disclosed for controlling the operation of a mild hybrid electric vehicle having an engine and high and low voltage power systems selectively connectable via a DC to DC converter. The method comprises whenever possible using only a low voltage battery forming part of the low voltage power system to power low voltage loads during an engine E-stop performed automatically to save fuel and reduce emissions and whenever possible using only a high voltage battery forming part of the high voltage power system to recharge the low voltage battery when the engine is restarted following the E-stop.

12 Claims, 2 Drawing Sheets

(51) Int. Cl.

| | | |
|---|---|---|
| *B60L 58/10* | (2019.01) | |
| *B60L 11/18* | (2006.01) | |
| *B60L 1/00* | (2006.01) | |
| *H02J 7/34* | (2006.01) | |
| *H02J 7/14* | (2006.01) | |
| *B60L 1/12* | (2006.01) | |
| *B60L 15/20* | (2006.01) | |
| *B60L 58/20* | (2019.01) | |
| *B60W 20/40* | (2016.01) | |
| *B60K 6/485* | (2007.10) | |
| *H02J 1/08* | (2006.01) | |

(52) U.S. Cl.
CPC .......... *H02J 7/1438* (2013.01); *H02J 7/1446* (2013.01); *H02J 7/34* (2013.01); *H02J 7/342* (2020.01); *B60K 6/485* (2013.01); *B60L 2210/10* (2013.01); *B60L 2240/44* (2013.01); *B60L 2240/526* (2013.01); *B60L 2240/547* (2013.01); *B60W 20/40* (2013.01); *H02J 1/082* (2020.01); *Y02T 10/6226* (2013.01); *Y02T 10/645* (2013.01); *Y02T 10/70* (2013.01); *Y02T 10/7005* (2013.01); *Y02T 10/7044* (2013.01); *Y02T 10/7066* (2013.01); *Y02T 10/7077* (2013.01); *Y02T 10/7216* (2013.01); *Y02T 10/7283* (2013.01); *Y02T 10/92* (2013.01); *Y10S 903/903* (2013.01); *Y10S 903/93* (2013.01)

(56) References Cited

U.S. PATENT DOCUMENTS

| | | | | |
|---|---|---|---|---|
| 7,657,350 | B2 * | 2/2010 | Moran | B60K 6/12 701/22 |
| 7,923,858 | B2 * | 4/2011 | Ito | B60R 16/03 307/9.1 |
| 8,020,650 | B2 * | 9/2011 | Van Maanen | B60L 3/0046 180/65.265 |
| 8,135,532 | B2 * | 3/2012 | Heap | B60K 6/365 701/99 |
| 8,442,718 | B2 * | 5/2013 | Ahn | B60L 58/12 701/36 |
| 8,531,053 | B2 * | 9/2013 | Choi | B60K 6/48 307/9.1 |
| 8,606,450 | B2 * | 12/2013 | Holmes | B60W 20/00 701/22 |
| 9,000,606 | B2 * | 4/2015 | Obayashi | B60L 1/003 307/9.1 |
| 9,376,104 | B2 * | 6/2016 | Christman | B60W 20/40 |
| 10,351,127 | B2 * | 7/2019 | Ohsaki | G07C 5/00 |
| 2007/0124037 | A1 * | 5/2007 | Moran | B60K 6/12 701/22 |
| 2007/0255477 | A1 * | 11/2007 | Okuda | B60L 58/14 701/93 |
| 2009/0206660 | A1 * | 8/2009 | Makita | H02J 7/1423 307/9.1 |
| 2009/0250279 | A1 * | 10/2009 | Holmes | B60L 58/21 180/65.285 |
| 2011/0025127 | A1 * | 2/2011 | Choi | B60K 6/48 307/10.1 |
| 2011/0202220 | A1 * | 8/2011 | Seta | B60L 58/14 701/22 |
| 2012/0306457 | A1 * | 12/2012 | Haggerty | B60K 6/485 322/29 |
| 2013/0197734 | A1 * | 8/2013 | Okura | B60L 3/0046 701/22 |
| 2013/0313898 | A1 * | 11/2013 | Proebstle | H02J 7/1423 307/10.1 |
| 2014/0024495 | A1 * | 1/2014 | Kim | B60K 6/52 477/167 |
| 2014/0180517 | A1 * | 6/2014 | Endo | B60W 10/06 701/22 |
| 2014/0210216 | A1 * | 7/2014 | Konishi | B60K 6/48 290/38 R |
| 2014/0244082 | A1 * | 8/2014 | Caron | B60K 6/46 701/22 |
| 2014/0336855 | A1 * | 11/2014 | Kwon | B60L 11/1885 701/22 |
| 2015/0046001 | A1 * | 2/2015 | Park | B60L 15/04 701/22 |
| 2015/0217761 | A1 * | 8/2015 | Christman | B60W 20/40 701/22 |

* cited by examiner

METHOD OF CONTROLLING A MILD HYBRID ELECTRIC VEHICLE

This application claims foreign priority benefits under 35 U.S.C. § 119(a)-(d) to GB 1320807.9 filed Nov. 26, 2013, which is hereby incorporated by reference in its entirety

TECHNICAL FIELD

This invention relates to a mild hybrid electric vehicle having a dual voltage electric power system and in particular to a method of controlling the dual voltage power system so as to improve the fuel consumption of an engine of the vehicle.

BACKGROUND

A hybrid electric vehicle is known from WO 2013/067292 having a dual energy storage system comprising a high voltage power system and a low voltage power system that are selectively connectible via a DC to DC converter.

Although the hybrid vehicle disclosed in WO2013/067292 has improved fuel economy compared to a vehicle having a single electrical power system due to the ability of the two electrical power systems to be used to capture energy with no fuel penalty transfer energy from the high voltage system to the low voltage system and use energy so captured to assist the engine the inventors have realised that further fuel savings can be achieved with no significant additional cost by operating such a system in a different manner.

It is an object of the invention to provide a mild hybrid electric vehicle having improved fuel economy by optimising the energy storage and utilisation efficiency of the two electrical power systems.

SUMMARY

According to the invention there is provided a method of controlling a mild hybrid electric vehicle having an engine and high and low voltage power systems selectively connectible by a DC to DC converter wherein the method comprises determining whether it is desirable to perform an automatic engine stop in order to improve fuel economy and, if it is desirable to stop the engine, stopping the engine and using a low voltage battery forming part of the low voltage power system to provide power to one or more low voltage loads forming part of the low voltage power system during the automatic engine stop irrespective of the state of charge of a high voltage battery forming part of the high voltage power system.

The method may further comprise, if the state of charge of the low voltage battery drops to a predefined minimum allowable limit while the engine remains stopped, connecting the high voltage power system to the lower voltage power system via the DC to DC converter and using the high voltage battery to power the low voltage electrical loads.

The method may further comprise, if the state of charge of the low voltage battery drops to a predefined minimum allowable limit while the engine remains stopped and the state of charge of the high voltage battery is below a predefined limit, connecting the high voltage power system to the lower voltage power system via the DC to DC converter, restarting the engine and using a high voltage integrated electrical starter-generator driven by the engine forming part of the high voltage power system to power the low voltage electrical loads.

The method may further comprise disabling the DC to DC converter during the automatic engine stop so as to isolate the high voltage battery from the low voltage power system.

The method may further comprise using the DC to DC converter to transfer energy from the high voltage battery to the low voltage battery after termination of the automatic engine stop to recharge the low voltage battery.

The high voltage system may further comprise a belt driven integrated starter-generator driveably connected to the engine and the method may further comprise using the belt driven integrated starter-generator as a motor to assist the engine to reduce the fuel consumption of the engine.

The high voltage system may further comprise a belt driven integrated starter-generator driveably connected to the engine and the method may further comprise using the belt driven integrated starter-generator as a high voltage electrical generator to recharge the high voltage battery when energy can be recuperated from the engine with no fuel penalty.

According to a second aspect of the invention there is provided a mild hybrid electric vehicle having an engine driveably connected to an integrated starter-generator forming part of a high voltage power system that also includes a high voltage battery, a low voltage power system having a low voltage battery and at least one low voltage load, a Dc to DC converter to selectively connect the high and low voltage systems together and an electronic controller to control operation of the engine, the high and low voltage power systems and the DC to DC converter wherein the electronic controller is operable to isolate the high voltage power system from the low voltage power system when the engine is automatically stopped in order to save fuel and use the low voltage battery to power the at least one low voltage load irrespective of the state of charge of the high voltage battery.

The electronic controller may be further operable to use the DC to DC converter to connect the high voltage system to the low voltage system and use the high voltage battery to recharge the low voltage battery when the engine is restarted after termination of the automatic engine stop.

The electronic controller may be operable to use the integrated starter generator as a motor to assist the engine to reduce the fuel consumption of the engine.

The electronic controller may be operable to use the integrated starter generator as a generator to recharge the high voltage battery when energy can be recuperated from the engine with no fuel penalty.

The electronic controller may be operable to connect the high voltage power system to the lower voltage power system via the DC to DC converter and use the high voltage battery to power the electrical loads if the state of charge of the low voltage battery drops to a predefined minimum allowable limit while the engine remains stopped.

The electronic controller may be operable to connect the high voltage power system to the lower voltage power system via the DC to DC converter, restart the engine and use the integrated starter-generator to power the low voltage electrical loads if the state of charge of the low voltage battery drops to a predefined minimum allowable limit while the engine remains stopped and the state of charge of the high voltage battery is below a predefined limit.

The invention will now be described by way of example with reference to the accompanying drawing of which:

DETAILED DESCRIPTION

As required, detailed embodiments of the present invention are disclosed herein; however, it is to be understood that the disclosed embodiments are merely exemplary of the invention that may be embodied in various and alternative forms. The Figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 2:
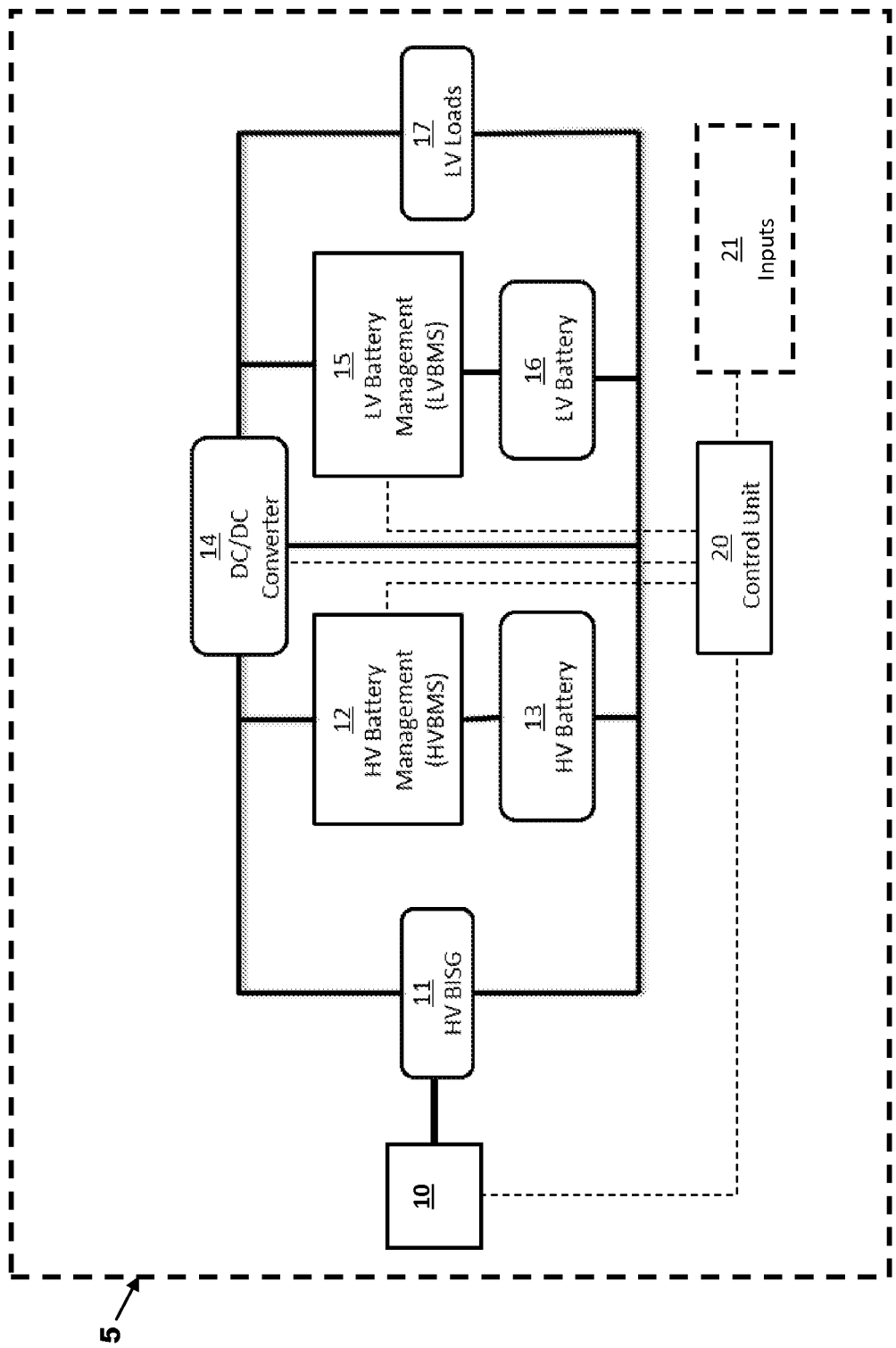
FIG. 2 is a schematic diagram of a mild hybrid electric vehicle having a dual voltage power system according to a second aspect of the invention.

With reference to FIG. 2 there is shown a mild hybrid electric vehicle 5 having a combustion engine 10 drivingly connected to a high voltage integrated motor generator 11 (BISG) forming part of a high voltage power system. The BISG 11 can operate in two modes, in the first mode it is driven by the engine 10 to produce electrical power for storage in a high voltage battery 13 (HV battery) forming part of the high voltage power system that also includes a high voltage battery management system 12 (HVBMS).

A 'mild hybrid electric vehicle' is one having an electric motor/generator (starter-generator) driveably connected to an engine of the vehicle to:

a/ assist the engine of the vehicle by producing mechanical torque using electricity stored in a high voltage battery;

b/ capture energy from the vehicle with no fuel penalty;

c/ store captured energy as electricity in the high voltage battery;

d/ start the combustion engine of the vehicle; and e/ provide electrical energy to users of the vehicle.

Such vehicles are sometimes also referred to as 'micro hybrid electric vehicles'. The electric motor is not used on its own in such a vehicle to drive the vehicle it is only used to assist the engine in driving the vehicle so as to reduce the instantaneous fuel consumption of the engine.

The high voltage power system is operatively connected via a DC to DC converter 14 to a low voltage power system comprising a low voltage battery 16 (LV battery) that also includes a low voltage battery management system 15 (LVBMS).

The low voltage power system also includes a number of low voltage loads (LV loads) which constitute the majority of the electrical devices provided on the motor vehicle 5.

In this case the low voltage power system operates at a nominal voltage of 12 volts and the high power system operates at a nominal voltage of 48 volts but the invention is not limited to the use of such voltages.

An electronic controller 20 is operatively connected to the DC to DC converter 14 and to the high and low voltage battery management systems (HVBMS 12 and LVBMS 15). In this case the electronic controller 20 is embodied as a single control unit but it will be appreciated that it could be formed of several interconnected electronic units or processors.

In this case the electronic controller 20 is an engine stop-start controller for the motor vehicle 5 and is connected to various inputs 21 used to determine when the engine 10 should be automatically stopped in order to save fuel. Such a stop is referred to herein as an 'E-stop' because its function is to increase the economy of the engine 10. As is well known in the art various triggers can be used to initiate an E-stop based upon operation of various driver actions and further triggers based upon driver actions can be used to initiate an automatic restart following an E-stop. Any suitable combination of stop and start triggers can be used in accordance with this invention. An automatic engine stop or E-stop is one where the engine 10 is temporarily stopped to save fuel and reduce emissions by the electronic controller 20 in response to one or more conditions based upon driver actions.

During normal running of the engine 10 the electronic controller 20 in response to information regarding the running state of the engine 10 and the state of charge (SOC) of the high voltage battery 13 operates the BISG 11 as either a generator to recharge the HV battery 13 or a motor to assist the engine 10 thereby reducing the fuel consumption of the engine 10. Advantageously the BISG 11 is operated as a generator with no fuel penalty when there is an opportunity to recover or recuperate kinetic energy from the vehicle 5.

Electrical power can also be transferred during normal running from the high voltage power system via the DC to DC converter 14 to recharge or maintain the SOC of the LV battery 16 at a predefined high level such as, for example, above 85% full.

When the inputs 21 indicate that an E-stop would be beneficial, the electronic controller 20 is operable to shut down the engine 10 and isolate the low voltage system from the high voltage system by switching disabling the DC to DC converter 14.

Therefore during an E-stop all of the electrical requirements of the low voltage loads 17 are met from the LV battery 16 irrespective of the SOC of the HV battery 13 which is isolated from the LV battery 16.

There are however two situations in which this arrangement cannot be used, firstly if the state of charge of the LV battery 16 falls below a predefined lower limit and secondly if the state of charge of both batteries are below predefined lower limits.

If the state of charge of the low voltage battery drops to a predefined minimum allowable limit while the engine remains stopped, the high voltage power system is connected to the lower voltage power system via the DC to DC converter 14 and the high voltage battery 13 used to power the low voltage electrical loads 17 to prevent damage occurring to the LV battery 16.

If the state of charge of the low voltage battery drops to a predefined minimum allowable limit while the engine remains stopped and the state of charge of the high voltage battery is below a predefined limit, the high voltage power system is connected to the lower voltage power system via the DC to DC converter, the engine is automatically restarted and the BISG 11 is used to power the low voltage electrical loads 17. This is because there is no power available in either battery 13, 16 and a supply of power to the low voltage loads must be maintained at all times.

When the inputs 21 to the electronic controller 20 indicate that a restart is required, the electronic controller 20 communicates this fact to the HVBMS 12 and is operable to supply electrical power from the HV battery 13 to the BISG 11 to restart the engine 10.

After the engine 10 is restarted the BISG 11 is preferably controlled by the HVBMS 13 in a neutral running state so as to minimise the load on the engine 10. The DC to DC converter 14 is then activated by the electronic controller 14 to recharge the LV battery 15 using the HV battery 13 so as to further discharge the HV battery 13. The recharging of the LV battery 16 will continue until the LV battery 16 is fully charged or the SOC of the HV battery 13 reaches a predefined fully discharged limit such as, for example, 15% full.

In the rare case where the LV battery 16 is not fully charged when the SOC of the HV battery 13 drops to the fully discharged limit, the BISG 11 is used to finish the charging of the LV battery 16. However, in most circumstances the LV battery 16 can be recharged using only the HV battery 13 and in all cases the HV battery 13 is discharged to a predefined allowable lower SOC limit before the BISG 11 is used to recharge the LV battery 16. This ensures that the maximum energy storage capacity is provided in the HV battery 13 and that the LV battery 16 is substantially fully charged ready for the next E-stop.

Whenever possible the use of the engine to drive the BISG 11 using fuel is avoided and the BISG 11 is instead driven by the engine 10 to recharge the HV battery 13 when energy can be recuperated from the vehicle 5.

One of the advantages of the invention is that there is no need to reserve any energy in the HV battery 13 to power the LV loads 17 during an E-stop because the electric energy is provided by the LV battery 16. Therefore there is a greater capacity available in the HV battery 13 to store recuperated energy from the motor vehicle 5 and potentially more energy available for use by the BISG 11 in assisting the engine 10.

In addition, because the electrical energy is supplied to the LV loads 17 directly from the LV battery 16 the conversion efficiency of the DC to DC converter 14 does not need to be taken into account. That is to say, the efficiency of the system is higher than would be the case if the HV battery 13 is used to power the loads during an E-stop where the efficiency of the DC to DC converter 14 is relevant. Therefore the amount of energy that needs to be available in the LV battery 16 to power the Low voltage loads 17 is less than would be required if the HV battery 13 were to be used to power the low voltage loads. In addition, because the power is supplied to recharge the LV battery rather than power the low voltage loads 17 the rate at which the transfer of energy from the high voltage power system is transferred to the low voltage power system can be set by the electronic controller so as to maximise the efficiency of the DC to DC converter 14 and the BISG 11 if it is used.

Based upon historical data, a 90th percentile stop duration is 33 seconds and the average 12V electric consumption to power the low voltage loads for C/D size car is 40-50 A. Therefore, assuming a drain of 45 A at 12.5V, 18.562 kJ is required from the LV battery 16 to supply the LV loads 17. Assuming the LV battery 16 is a 60 Ah 12V Battery with a nominal voltage of 12.5 V this gives the LV battery SOC equivalent of an "E-Stop" as:

18.562 kJ/(60×3600×12.5)=(18.562×100)/2700=0.6875% SOC.

Assuming an efficiency of 90% for the DC to DC converter 14 will produce an "E-Stop" energy requirement of 18.562/0.9=20.625 kJ if the HV battery 13 were to be used. It will be appreciated that it is this amount of energy that is required from the HV battery 13 as a minimum to recharge the LV battery 16 after the engine 10 has been restarted. If insufficient energy is left in the HV battery 13 then the BISG 11 could be used to finish charging of the LV battery.

Assuming the HV battery 13 is a 48V Battery made of thirteen 5 Ah Li-Ion cells with a nominal voltage of 3.8 V which are typical production Li-Ion cells gives the HV battery SOC equivalent energy for the "E-Stop" as:

20.626 kJ/(65×3600×3.8)=(20.625×100)/889.2=2.32% SOC

Therefore the energy required to recharge the LV battery 16 from the HV battery 13 is 2.32% SOC of the HV battery 13 and the total potential vehicle gain is equal to double this namely 4.64% SOC because there is no longer the need to reserve 2.32% SOC in the HV battery 13 for powering the LV loads 17 during the E-stop. That is to say, if the HV battery 13 is used to power the low voltage loads 17 during an E-stop the minimum usable SOC would be 22.3% assuming 20% to be the minimum allowable SOC.

Therefore an additional equivalent energy of 4.64% of SOC of the HV battery 13 is available with the strategy proposed by this invention to recuperate and store kinetic energy and this additional energy can be delivered back to the vehicle resulting in additional fuel saving capability.

As referred to above, one of the advantages of the invention is that recharging of the LV battery 16 can be made at a rate that produces the best electrical system efficiency rather than at the rate required to meet the needs of the low voltage loads.

For example, if the low voltage loads require 45 A for 33 seconds during the E-stop, then this is the current that must be supplied by the DC to DC converter 14 at an outlet side of the DC to DC converter 14 and will cause the DC to DC converter 14 to operate at a efficiency corresponding to that outlet current. However, the DC to DC converter 14 may not operate very efficiently when supplying 45 A but instead will operate at high/maximum efficiency when the outlet current is 90 A. In accordance with this invention the system can be controlled by the electronic controller 20 to produce such an outlet current thereby allowing the LV battery 16 to be recharged in less than 16.5 seconds by the HV battery 13. The exact time required will depend upon the actual efficiency of the DC to DC converter when operating at 90 A but, because the DC to DC converter is now operating at a higher efficiency, the time required will be less than that when it was operating at the 45 A with a lower efficiency. Similarly, if the DC to DC converter 14 operates at a high efficiency with an outlet current of 22.5 A then the electronic controller 20 can operate the system so as to produce such an outlet current which would need to be supplied for les than 66 seconds to recharge the LV battery 16 given that the efficiency will now be higher.

A similar situation is present if the BISG 11 is used to recharge the LV battery 16, the rate of charging can be optimised to suit both the BISG 11 and the DC to DC converter 14 which is not the case if the BISG 11 is used to power the low voltage loads because the magnitude of the demand is then set by a user of the vehicle 5.

Therefore by using the invention the electrical demands of the low voltage loads are separated from the high voltage power system and its associated transfer efficiencies by using the LV battery whenever possible to meet these demands thereby enabling the DC to DC converter and the BISG to be operated at or close to their optimum efficiencies.

Figure 1:
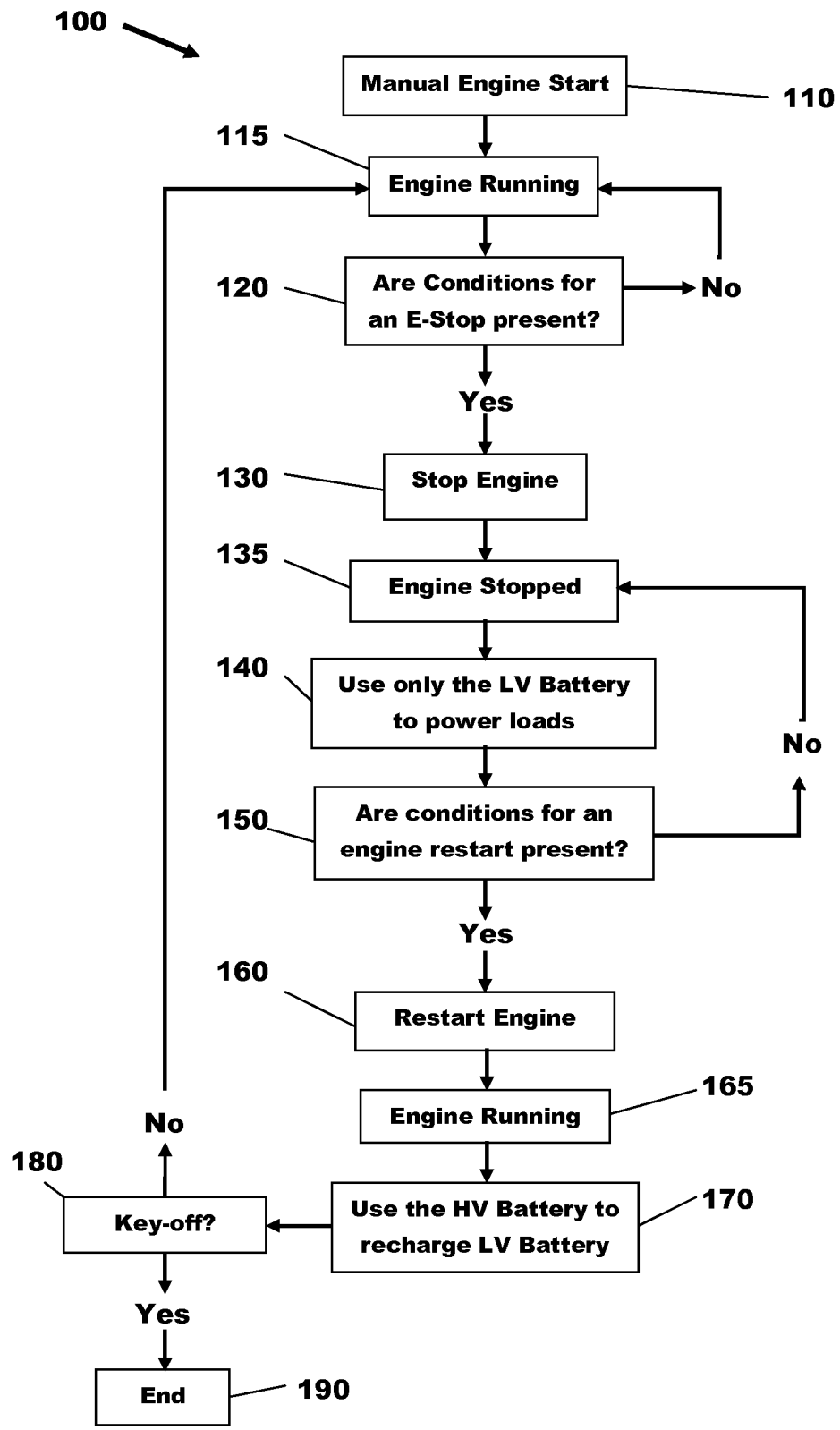
FIG. 1 is a high level flow chart of a method of controlling a mild hybrid electric vehicle in accordance with a first aspect of the invention.

With reference to FIG. 1 there is shown a method 100 for controlling a mild hybrid vehicle such as the vehicle 5 shown in FIG. 2 having high voltage and low voltage interconnected electrical power systems.

The method starts in box 110 with a manual engine start often referred to as a key-on event. The engine may be started using a BISG or by a conventional starter motor if one is fitted to the vehicle 5. The method then advances to box 115 with the engine running and on to box 120 where it is checked whether the conditions for an E-stop are present In the case of an automatic vehicle these conditions may be that an accelerator pedal is not being pressed and a brake pedal is being pressed. In the case of a manual transmission this will normally be based upon whether a gear is selected and the position of a clutch pedal. For example and without limitation, two typical combinations of conditions are firstly that a clutch pedal is fully depressed and a transmission in gear (a stop in gear stop) and secondly, no gear selected with the brake pedal pressed (a stop in neutral stop). It will be appreciated that numerous combinations of engine stop conditions are known and that the invention is not limited to any particular combination of engine stop conditions.

If a predefined combination of conditions is present then the method advances to box 130 otherwise it returns to box 115 with the engine running.

In box 130 the engine is shutdown and in box 135 it is stopped, that is to say, it has entered an E-stop.

Either during the period when the engine is being shutdown or when it is determined to have stopped action is taken to isolate the high voltage system from the low voltage system to which is connected a number of low voltage loads. Therefore, as indicated in box 140, only the LV battery is preferably used during the E-stop to power the low voltage loads. As referred to above if the SOC of the low voltage battery drops to a lower predefined level then as a first alternative the high voltage battery is used to power the low voltage loads and if the SOC of the high voltage battery is also too low to permit its use then, as a last resort, the engine is automatically restarted to preserve the supply of power to the low voltage loads by using the engine driven electrical generator.

The method continues in box 150 with a check to determine whether the conditions for an engine restart are present. For example and without limitation, in the case of an automatic vehicle these conditions could be the releasing of a brake pedal or the application of pressure to an accelerator pedal and in the case of a manual transmission vehicle these conditions could be the partial releasing of a clutch pedal while the transmission is in gear or the depressing of a clutch pedal and the engagement of a gear if the transmission is in neutral during the E-stop. It will be appreciated that numerous combinations of engine restart conditions are known and that the invention is not limited to any particular combination of restart conditions.

If the conditions are not present the method returns to box 135 with the engine still stopped and the LV battery still supplying power to the low voltage loads. This E-stop state will continue until the conditions for a restart are present at which time the method advances to box 160 where the engine is restarted. This is normally effected by using a BISG drivingly connected to the engine so as to maximise the discharging of a HV battery to which the BISG is operably connected.

After the restart the engine is running as indicated in box 165 and then in box 170 the HV battery is connected to the LV battery via a DC to DC converter so as to recharge the LV battery from the HV battery.

When a desired level of recharging of the LV battery has been reached which may be a % SOC of substantially 100% recharging from the HV battery is terminated leaving the HV battery in a highly discharged state so as to maximise future energy recuperation opportunities.

Preferably, the BISG is operated in a neutral state during this time period so that it produces minimal drag on the engine and produces substantially no electrical energy. Only if the HV battery is unable to recharge the LV battery is the BISG used to generate electrical power at this time for recharging the LV battery. This is so as to minimise the use of fuel by the engine for electricity generation.

From box 170 the method returns via box 180 to box 115 with the engine running and then the subsequent steps are repeated.

In box 180 a Key-off event is shown. If no key-off event occurs then the method will return to box 115 but if a key-off event occurs then the method will terminate as indicated by box 190.

It will be appreciated that a key-off event could occur at other points in time during the execution of the steps 115 to 170 and that, in each case, a key-off event will result in an ending of the method.

As previously referred to by not having to reserve electrical energy in the HV battery to power the low voltage loads during an E-stop and then using the HV battery to recharge the LV battery until either the LV battery is fully charged or the HV battery is fully discharged (that is to say, at the minimum allowable SOC level) it is possible to increase the fuel economy of the engine by having more potential energy available in the HV battery to assist the engine and more storage capacity in the HV battery to store recuperated energy.

For example, if in a prior art arrangement 2.5% SOC has to be reserved for restarting the engine and 2.32% has to be reserved for powering the low voltage loads during an E-stop, the minimum SOC permissible for the HV battery is 20% and the maximum SOC permissible is 85% then the total potential capacity for energy storage for use in assisting the engine will be 85−(20+2.5+2.32)=60.18% SOC.

However, by using a method as proposed in this invention there is the potential for 62.5% SOC to be available for use in assisting the engine.

In addition, because 2.32% SOC is required to recharge the LV batter y after the restart, the SOC of the HV battery will be reduced by this amount after the restart thereby ensuring the maximum possible discharging of the HV battery.

It will be appreciated that the invention is not limited to systems using 48 and 12 volts and that it can be applied to systems in which the high and low voltages are different to these voltages.

It will be appreciated by those skilled in the art that although the invention has been described by way of example with reference to one or more embodiments it is not limited to the disclosed embodiments and that alternative embodiments could be constructed without departing from the scope of the invention as defined by the appended claims.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of controlling a vehicle comprising:
causing by a controller a low voltage (LV) battery to exclusively provide power to one or more LV loads for an entire duration of an automatic engine stop responsive to a state of charge of the LV battery remaining above a threshold, and charging the LV battery with a high voltage (HV) battery responsive to an automatic engine restart.

2. The method as claimed in claim 1 further comprising, responsive to a state of charge of the LV battery dropping to a predefined minimum allowable limit while an engine remains stopped, connecting the HV battery to the LV battery via a DC to DC converter and using the HV battery to power the LV loads.

3. The method as claimed in claim 1 further comprising, responsive to a state of charge of the LV battery dropping to a predefined minimum allowable limit while an engine remains stopped and the state of charge of the HV battery is below a predefined limit, connecting the HV battery to the LV battery via a DC to DC converter, restarting the engine and using a HV integrated electrical starter-generator driven by the engine to power the LV loads.

4. The method as claimed in claim 1 further comprising disabling a DC to DC converter during the automatic engine stop so as to isolate the HV battery from the LV loads.

5. The method as claimed in claim 1 further comprising using a belt driven integrated starter-generator as a motor to assist an engine to reduce fuel consumption of the engine.

6. The method as claimed in claim 1 further comprising using a belt driven integrated starter-generator as a high voltage electrical generator to recharge the HV battery to recapture energy from an engine with no fuel penalty.

7. A mild hybrid electric vehicle having an engine driveably connected to an integrated starter-generator forming part of a high voltage power system that also includes a high voltage battery, a low voltage power system having a low voltage battery and at least one low voltage load, a DC to DC converter to selectively connect the high and low voltage systems together and an electronic controller to control operation of the engine, the high and low voltage power systems and the DC to DC converter, wherein the electronic controller is operable to isolate the high voltage power system from the low voltage power system for an entire duration of an automatic engine stop in order to save fuel and exclusively use the low voltage battery to power the at least one low voltage load while a state of charge of the low voltage battery remains above a threshold, and responsive to an automatic engine restart, to charge the low voltage battery with the high voltage battery.

8. The vehicle as claimed in claim 7 wherein the electronic controller is operable to use the integrated starter-generator as a motor to assist the engine to reduce fuel consumption of the engine.

9. The vehicle as claimed in claim 7 wherein the electronic controller is operable to use the integrated starter-generator as a generator to recharge the high voltage battery to recuperate energy from the engine with no fuel penalty.

10. The vehicle as claimed in claim 7 wherein the electronic controller is operable to connect the high voltage power system to the low voltage power system via the DC to DC converter and use the high voltage battery to power the low voltage load in response to a state of charge of the low voltage battery dropping to a predefined minimum allowable limit while the engine remains stopped.

11. The vehicle as claimed in claim 7 wherein the electronic controller is operable to connect the high voltage power system to the low voltage power system via the DC to DC converter, restart the engine and use the integrated starter-generator to power the low voltage loads responsive to the state of charge of the low voltage battery dropping to a predefined minimum allowable limit while the engine remains stopped and the state of charge of the high voltage battery is below a predefined limit.

12. A vehicle comprising:
   a traction battery;
   an auxiliary battery; and
   a controller operable to, for an entire duration of an engine auto stop, isolate the traction battery from the auxiliary battery and exclusively use the auxiliary battery to power an auxiliary load responsive to a state of charge of the auxiliary battery remaining above a threshold, and charge the auxiliary battery with the traction battery responsive to an engine auto start.

* * * * *